(12) United States Patent
Kishikawa et al.

(10) Patent No.: US 12,524,667 B2
(45) Date of Patent: Jan. 13, 2026

(54) MODEL CREATION DEVICE, MODEL CREATION METHOD, AND MODEL CREATION SYSTEM

(71) Applicant: TOYOTA JIDOSHA KABUSHIKI KAISHA, Toyota (JP)

(72) Inventors: Daiki Kishikawa, Nagoya (JP); Kazuki Fujii, Hadano (JP); Yusuke Takasu, Mlshima (JP); Masato Ehara, Gotemba (JP); Naoya Oka, Nagoya (JP); Shuji Moriyama, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 725 days.

(21) Appl. No.: 17/939,411

(22) Filed: Sep. 7, 2022

(65) Prior Publication Data

US 2023/0108119 A1    Apr. 6, 2023

(30) Foreign Application Priority Data

Oct. 1, 2021   (JP) .................................. 2021-162690

(51) Int. Cl.
*G06N 3/08* (2023.01)
*G06N 3/045* (2023.01)

(52) U.S. Cl.
CPC .............. *G06N 3/08* (2013.01); *G06N 3/045* (2023.01)

(58) Field of Classification Search
CPC ........ G06F 16/13; G06F 16/24; G06F 16/156; G06F 3/1297; G06N 3/00; G06N 5/00; G05B 13/00; H03M 7/30; H04N 9/8042; G06T 9/00

See application file for complete search history.

(56) References Cited

U.S. PATENT DOCUMENTS

| | | | | |
|---|---|---|---|---|
| 11,494,587 | B1 * | 11/2022 | Ganesan | G06F 18/2148 |
| 12,082,904 | B2 * | 9/2024 | Saphier | G16H 20/30 |
| 12,141,662 | B1 * | 11/2024 | Couture | G06F 16/906 |
| 12,182,673 | B1 * | 12/2024 | Yang | G06N 3/045 |
| 2019/0147361 | A1 * | 5/2019 | Matsumoto | G06F 16/22 706/12 |
| 2019/0213039 | A1 * | 7/2019 | Lecue | G06N 3/096 |
| 2023/0032585 | A1 * | 2/2023 | Jeuk | H04L 41/12 |

(Continued)

FOREIGN PATENT DOCUMENTS

WO    2018142766 A1    8/2018

*Primary Examiner* — Hung D Le
(74) *Attorney, Agent, or Firm* — Oliff PLC

(57) ABSTRACT

A device for creating a target model adapted for a target environment and outputting a target output when a target input is input includes: a unit for determining candidate models adapted respectively for candidate environments different from the target environment and outputting a reference output respectively when a reference input is input; a unit for determining a basic environment from among the candidate environments based on the data of the reference output obtained by respectively inputting teacher data of the reference input related to the target environment into the candidate models, and teacher data of the reference output corresponding to the teacher data of the reference input; a unit for determining, as a basic model, a model adapted for the basic environment and outputting the target output when the target input is input; and a unit for creating the target model based on the basic model.

9 Claims, 5 Drawing Sheets

(56) References Cited

U.S. PATENT DOCUMENTS

| | | | | |
|---|---|---|---|---|
| 2023/0060753 A1* | 3/2023 | Matsuoka | ......... | G06F 16/33295 |
| 2023/0080309 A1* | 3/2023 | Bharti | ................ | G06Q 10/1053 |
| | | | | 705/321 |
| 2023/0094000 A1* | 3/2023 | Meliksetian | ............. | G06N 5/01 |
| | | | | 702/3 |

* cited by examiner

MODEL CREATION DEVICE, MODEL CREATION METHOD, AND MODEL CREATION SYSTEM

FIELD

The present disclosure relates to a model creation device, a model creation method, and a model creation system.

BACKGROUND

It is known a learned model providing system for selecting one or more learned models adapted for the purpose of use of a user-side device from among a plurality of learned models that are previously stored in a database, so as to provide the one or more learned models to the user-side device, in accordance with a use request acquired from the user-side device (see, for example, Patent Literature 1, Paragraph 0037). Patent Literature 1 also discloses that the selected learned models are fine-tuned and then provided to the user-side device.

CITATION LIST

Patent Literature

[PTL 1] WO2018/142766

SUMMARY

Technical Problem

Patent Literature 1 may be able to provide a learned model necessary for the user-side device in a short time. However, in Patent Literature 1, the learned model selected from the database is limited to a model adapted for the purpose of use of the user-side device. That is, if a learned model necessary for the user-side device is, for example, a learned model which outputs the age of a user when the user's face image is input, a learned model to be selected is limited to a learned model which outputs the age of the user when the user's face image is input, from among the learned models stored in the database. As a result, the selected learned model may not be appropriate, and the learned model provided to the user-side device may not provide accurate results.

Solution to Problem

According to the present disclosure, the followings are provided.
[Configuration 1]
A model creation device for creating a target model which is adapted for a target environment and which is configured to output a target output when a target input is input, comprising:
  a candidate model determination unit configured to determine a plurality of candidate models, the candidate models being adapted respectively for a plurality of candidate environments different from the target environment and being configured to output a reference output respectively when a reference input is input, the reference input and the reference output satisfying either or both of the fact that the reference input is different from the target input and the fact that the reference output is different from the target output;
  a basic environment determination unit configured to determine a basic environment from among the plurality of candidate environments, based on the data of the reference output obtained by respectively inputting teacher data of the reference input related to the target environment into the plurality of candidate models, and teacher data of the reference output corresponding to the teacher data of the reference input;
  a basic model determination unit configured to determine, as a basic model, a model which is adapted for the basic environment and is configured to output the target output when the target input is input; and
  a target model creation unit configured to create the target model based on the basic model.
[Configuration 2]
The model creation device according to configuration 1, wherein the reference input is different from the target input and the reference output is different from the target output.
[Configuration 3]
The model creation device according to configuration 1 or 2, wherein the basic environment determination unit is configured to determine a candidate model having the highest correlation between the data of the reference output obtained by respectively inputting the teacher data of the reference input into the plurality of candidate models and the teacher data of the reference output, and to determine, as the basic environment, a candidate environment for which the candidate model having the highest correlation is adapted.
[Configuration 4]
The model creation device according to any one of configurations 1 to 3, wherein the target model creation unit is configured to set the basic model to the target model, as it is.
[Configuration 5]
The model creation device according to any one of configurations 1 to 3, wherein the target model creation unit is configured to create the target model by fine-tuning the basic model.
[Configuration 6]
The model creation device according to any one of configurations 1 to 3, wherein the target model creation unit is configured to create the target model by transfer-learning the basic model.
[Configuration 7]
The model creation device according to any one of configurations 1 to 6, wherein the target environment and the candidate environment are cities.
[Configuration 8]
A model creation method of creating a target model which is adapted for a target environment and which is configured to output a target output when a target input is input, comprising:
  determining a plurality of candidate models, the candidate models being adapted respectively for a plurality of candidate environments different from the target environment and being configured to output a reference output respectively when a reference input is input, the reference input and the reference output satisfying either or both of the fact that the reference input is different from the target input and the fact that the reference output is different from the target output;
  determining a basic environment from among the plurality of candidate environments, based on the data of the reference output obtained by respectively inputting teacher data of the reference input related to the target environment into the plurality of candidate models, and teacher data of the reference output corresponding to the teacher data of the reference input;

determining, as a basic model, a model which is adapted for the basic environment and is configured to output the target output when the target input is input; and creating the target model based on the basic model.

[Configuration 9]

A model creation system for creating a target model which is adapted for a target environment and which is configured to output a target output when a target input is input, comprising:

a candidate model determination unit configured to determine a plurality of candidate models, the candidate models being adapted respectively for a plurality of candidate environments different from the target environment and being configured to output a reference output respectively when a reference input is input, the reference input and the reference output satisfying either or both of the fact that the reference input is different from the target input and the fact that the reference output is different from the target output;

a teacher data acquisition unit configured to acquire teacher data of the reference input related to the target environment and teacher data of the reference output corresponding to the teacher data of the reference input;

a basic environment determination unit configured to determine a basic environment from among the plurality of candidate environments, based on the data of the reference output obtained by respectively inputting the teacher data of the reference input into the plurality of candidate models, and the teacher data of the reference output;

a basic model determination unit configured to determine, as a basic model, a model which is adapted for the basic environment and is configured to output the target output when the target input is input; and a target model creation unit configured to create the target model based on the basic model.

Advantageous Effects of Invention

A model which provides more appropriate results can be more easily created.

DESCRIPTION OF EMBODIMENTS

Figure 1:
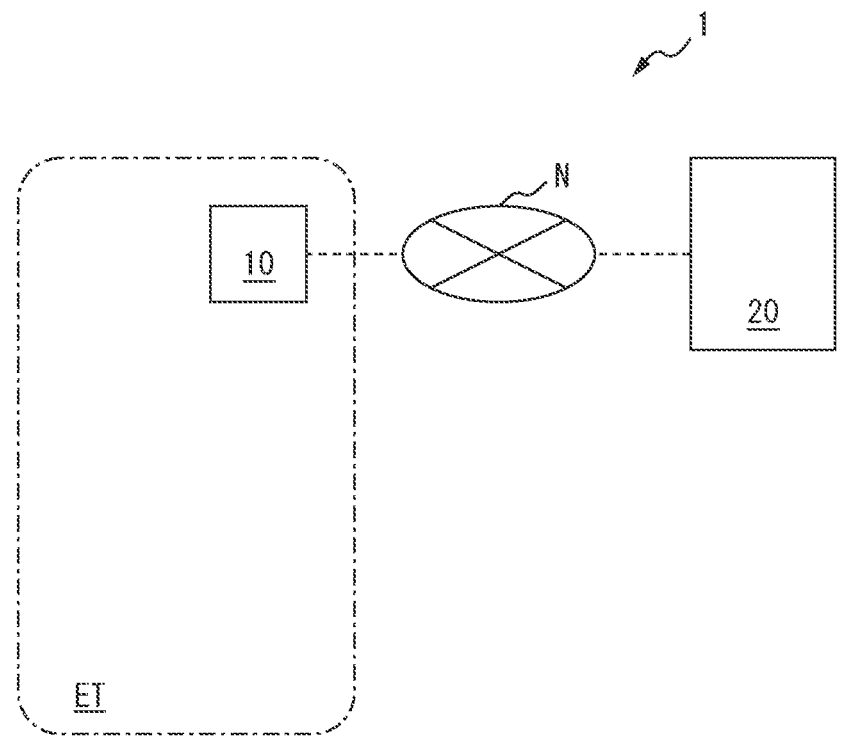
FIG. 1 is a schematic overall view of a model creation system according to an embodiment of the present disclosure.

FIG. 1 schematically shows a model creation system 1 according to an embodiment of the present disclosure.

Referring to FIG. 1, the model creation system 1 of the embodiment according to the present disclosure includes a user device 10 and a server 20. The user device 10 of the embodiment according to the present disclosure is provided in association with a target environment ET. In an example shown in FIG. 1, the user device 10 is installed in the target environment ET. On the other hand, in the example shown in FIG. 1, the server 20 is installed outside the target environment ET. The user device 10 and the server 20 of the embodiment according to the present disclosure are communicably connected to each other via a communication network N such as the Internet.

Figure 2:
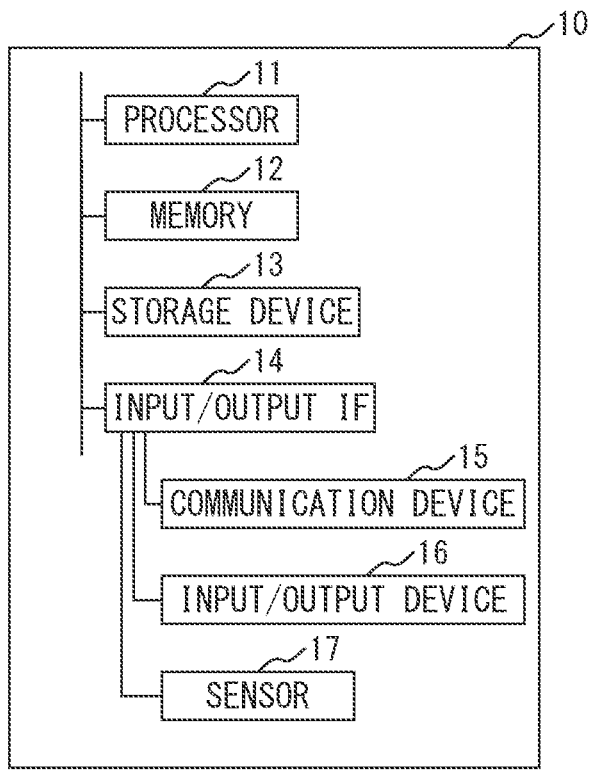
FIG. 2 is a schematic view of a user device according to an embodiment of the present disclosure.

As shown in FIG. 2, the user device 10 of the embodiment according to the present disclosure includes one or more processors 11, one or more memories 12, a storage device 13, and an input/output interface (IF) 14, which are communicably connected to each other by a bidirectional bus.

The one or more memories 12 of the embodiment according to the present disclosure include a volatile or non-volatile memory. Various programs, etc. are stored in the one or more memories 12, and these programs are executed by the one or more processors 11. Models that have been created, etc. are stored in the storage device 13 of the embodiment according to the present disclosure.

A communication device 15, an input/output device 16, and one or more sensors 17 are communicably connected to the input/output IF 14 of the embodiment according to the present disclosure. The communication device 15 of the embodiment according to the present disclosure is communicably connected to the above-mentioned communication network N. The input/output device 16 of the embodiment according to the present disclosure includes, for example, a keyboard, a mouse, a media reader/writer, a display, etc. The one or more sensors 17 of the embodiment according to the present disclosure acquire one or more data related to the target environment ET. In one example, the one or more sensors 17 are installed within the target environment ET. The one or more sensors 17 detect, for example, one or more of data related to the weather (temperature, precipitation, humidity, etc.), traffic volume, power consumption, etc., of the target environment ET.

Figure 3:
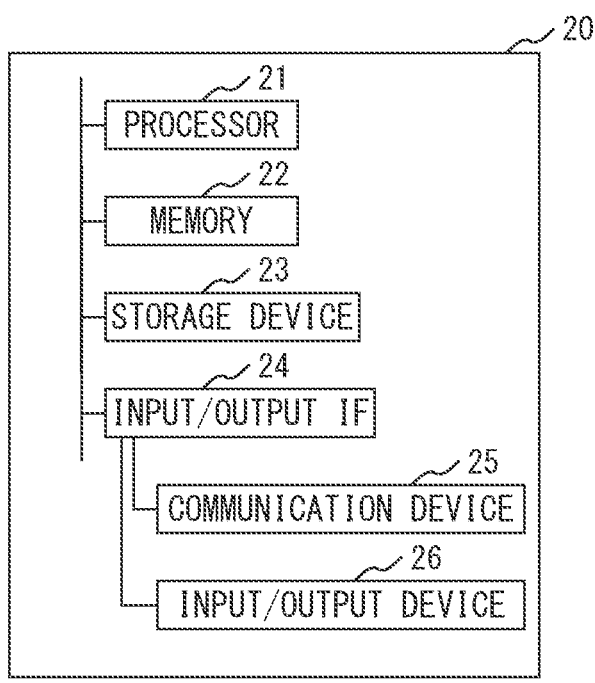
FIG. 3 is a schematic view of a server according to an embodiment of the present disclosure.

On the other hand, as shown in FIG. 3, the server 20 of the embodiment according to the present disclosure includes one or more processors 21, one or more memories 22, a storage device 23, and an input/output interface (IF) 24, which are communicably connected to each other by a bidirectional bus.

The one or more memories 22 of the embodiment according to the present disclosure includes a volatile or non-volatile memory. Various programs, etc. are stored in the one or more memories 22, and these programs are executed by the one or more processors 21. Models that have been created, etc. are stored in the storage device 23 of the embodiment according to the present disclosure.

A communication device 25 and an input/output device 26 are communicably connected to the input/output IF 24 of the embodiment according to the present disclosure. The communication device 25 of the embodiment according to the present disclosure is communicably connected to the above-mentioned communication network N. The input/output device 26 of the embodiment according to the present disclosure includes, for example, a keyboard, a mouse, a media reader/writer, a display, etc.

The model creation system 1 of the embodiment according to the present disclosure creates a model adapted for the target environment ET. In the embodiment according to the present disclosure, a model adapted for a certain environment is adapted for outputting, when an input related to the certain environment is input, an output corresponding to the input and related to the certain environment. In other words, a model adapted for a certain environment is adapted for representing the relationship between an input related to the certain environment and an output related to the certain environment.

In the embodiment according to the present disclosure, the target environment ET is a city such as a smart city or a connected city that uses big data, etc. In one example, the target environment ET is a new smart city.

Further, the model creation system 1 of the embodiment according to the present disclosure creates a target model MT. The target model MT of the embodiment according to the present disclosure is a model which outputs a target output OT when a target input IT is input, or a model in which an input is a target input IT and an output is a target output OT. Note that, in the embodiment according to the present disclosure, a model is created by, for example, AI or artificial intelligence, particularly, machine learning or deep learning. Further, the model uses, for example, a neural network, a support vector machine, a random forest, etc. In one example, a model is used to, for example, estimate a feature amount of a smart city, calculate control parameters for autonomous driving of a vehicle, etc. Note that an input of a model includes one or more parameters. Similarly, an output of a model includes one or more parameters.

In one example, the target input IT is a temperature in the target environment ET, and the target output OT is a power consumption in the target environment ET.

In the embodiment according to the present disclosure, the target model MT is created as follows. That is, first, the target input IT and the target output OT are input to the user device 10 by a user via the input/output device 16. Subsequently, in the user device 10, a reference input IR and a reference output OR are set. In the embodiment according to the present disclosure, the reference input IR and the reference output OR satisfy either or both of the fact that the reference input IR is different from the target input IT and the fact that the reference output OR is different from the target output OT. In other words, the reference input IR and the reference output OR are set so that "IR≠IT and OR≠OT" or "IR=IT and OR≠OT" or "IR≠IT and OR=OT" is satisfied. Further, in other words, the reference input IR and the reference output OR are set so that "IR=IT and OR=OT" is not satisfied.

In one example, in a case where the target input IT is a temperature in the target environment ET and the target output OT is a power consumption in the target environment ET, the reference input IR is a day of the week in the target environment ET and the reference output OR is a traffic volume in the target environment ET.

Subsequently, in the embodiment according to the present disclosure, teacher data related to the target environment ET are acquired. The teacher data in this respect include teacher data IRT of the reference input IR and teacher data ORT of the reference output OR corresponding to the teacher data of the reference input IR. In one example, the teacher data are acquired by the sensors 17 installed within the target environment ET. In another example, teacher data that have been previously acquired in relation to the target environment ET are acquired from the storage device 13 or the input/output device 16. When the acquisition of the teacher data is completed, that is, for example, when the number of acquired teacher data reaches a predetermined value, the teacher data are transmitted from the user device 10 to the server 20 together with an instruction to create the target model MT.

When the server 20 receives the instruction in question, the server 20 determines a plurality of candidate models MC from among the models stored in the storage device 23 of the server 20. The candidate models MC are models which are adapted respectively for a plurality of candidate environments EC different from the target environment ET, and which output the reference output OR when the reference input IR is input. In one example, the candidate environments EC are existing smart cities.

Figure 4:
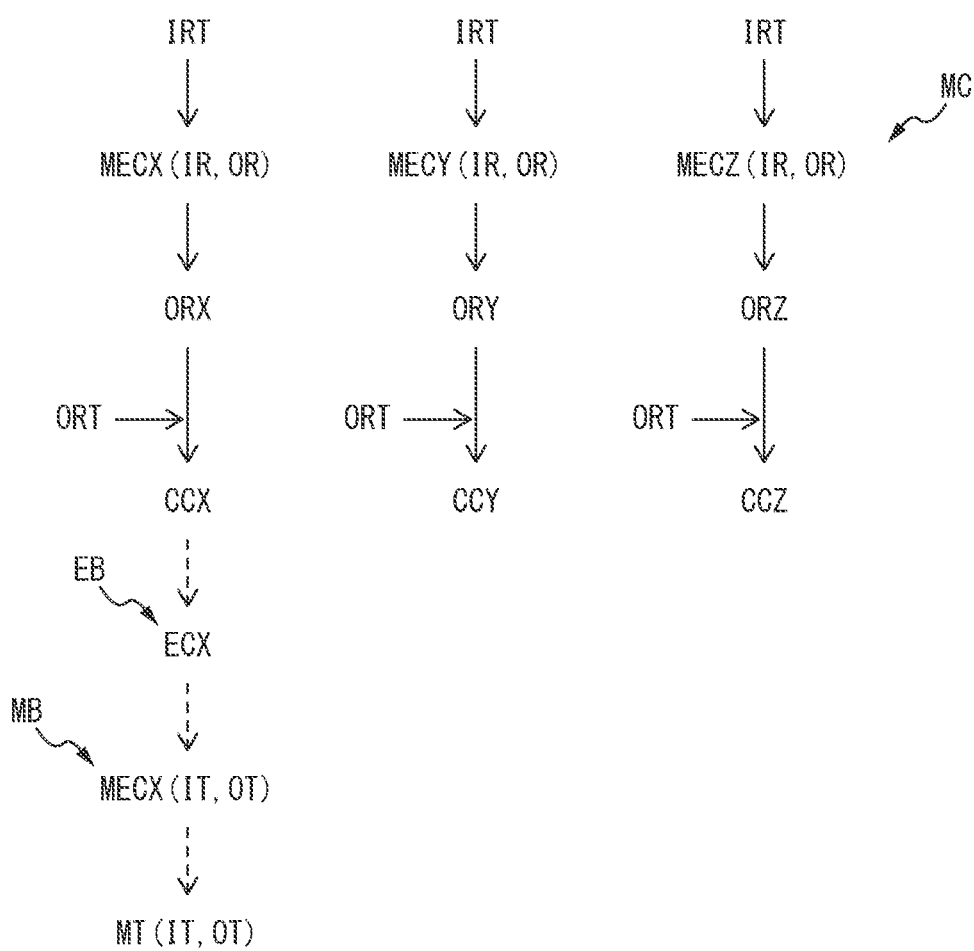
FIG. 4 is a schematic diagram illustrating a model creation method according to an embodiment of the present disclosure.

FIG. 4 shows an example of the candidate models MC. The candidate models MC of the example shown in FIG. 4 include a model MECX(IR, OR) which is adapted for a candidate environment ECX and outputs the reference output OR when the reference input IR is input, a model MECY(IR, OR) which is adapted for a candidate environment ECY and outputs the reference output OR when the reference input IR is input, and a model MECZ(IR, OR) which is adapted for a candidate environment ECZ and outputs the reference output OR when the reference input IR is input. The candidate environments ECX, ECY and ECZ are different from the target environment ET.

Subsequently, the teacher data of the reference input IR is input to the candidate models MC, respectively, and the data of the reference output OR are thus output from the candidate models MC, respectively.

In the example shown in FIG. 4, teacher data IRT of the reference input IR are input to the candidate model MECX(IR, OR), and data ORX of the reference output OR are output from the candidate model MECX(IR, OR). Similarly, the teacher data IRT of the reference input IR are input to the candidate models MECY(IR, OR) and MECZ(IR, OR), respectively, and the data ORY and ORZ of the reference output OR are output from the candidate models MECY(IR, OR) and MECZ(IR, OR), respectively.

Subsequently, a basic environment EB is determined from among the plurality of candidate environments EC based on the data of the reference output OR output from the candidate models MC and the teacher data ORT of the reference output OR. In the embodiment according to the present disclosure, the correlations between the data of the reference output OR output from the candidate models EC and the teacher data ORT of the reference output OR are calculated, respectively. In one example, the correlation is represented by a correlation coefficient CC.

In the example shown in FIG. 4, a correlation coefficient CCX between the output data ORX of the candidate model MECX(IR, OR) and the teacher data ORT of the reference output OR is calculated. Similarly, correlation coefficients CCY and CCZ between the output data ORY and ORZ of the candidate models MECY(IR, OR) and MECZ(IR, OR) and the teacher data ORT of the reference output OR are calculated, respectively.

Subsequently, a candidate model MC having the highest correlation between the data of the reference output OR of the candidate model EC and the teacher data ORT of the reference output OR is determined. Further, a candidate environment EC for which the above candidate model MC is adapted is determined as the basic environment EB.

In the example shown in FIG. 4, in the case where the correlation coefficient CCX is larger than the correlation coefficients CCY and CCZ, the candidate model MECX(IR, OR) is determined as a candidate model MC having the highest correlation. In this respect, the candidate environment ECX is determined as the basic environment EB.

Subsequently, a model MEB(IT, OT), which is adapted for the basic environment EB and outputs the target output OT when the target input IT is input, is determined as the basic model MB. One or more models adapted for the basic environment EB are stored in the storage device 23 of the server 20 of the embodiment according to the present disclosure, and the basic model MB is determined from among these models.

In the example shown in FIG. 4, in a case where the candidate environment ECX is determined as the basic environment EB, the model MECX(IT, OT), which is adapted for the basic environment ECX and outputs the target output OT when the target input IT is input, is determined as the basic model MB.

Subsequently, the target model MT is created based on the basic model MB.

The embodiment according to the present disclosure will be further described, with reference to a specific example. The target environment ET is a new smart city, the target input IT is a day of the week, and the target output OT is a traffic volume. In this respect, the target model MT is a model MN(Day of the week, Traffic volume) which is adapted for the new smart city and outputs the traffic volume when the day of the week is input. On the other hand, the reference input IR is a temperature, and the reference output OR is a power consumption. The candidate environments EC are existing smart cities X, Y and Z. The candidate models are a model MX(Temperature, Power consumption) which is adapted for the existing smart city X and outputs the power consumption when the temperature is input, a model MY(Temperature, Power consumption) which is adapted for the existing smart city Y and outputs the power consumption when the temperature is input, and a model MZ(Temperature, Power consumption) which is adapted for the existing smart city Z and outputs the power consumption when the temperature is input. Subsequently, the data of the temperature in the new smart city is input to the candidate model MX(Temperature, Power consumption), and the data of the power consumption are output. Similarly, the data of the temperature in the new smart city is input to both the candidate models MY(Temperature, Power consumption) and MZ(Temperature, Power consumption), and the data of the power consumption are output therefrom. Subsequently, the correlation coefficients between the data of the power consumption output from the candidate models MX(Temperature, Power consumption), MY(Temperature, Power consumption) and MZ(Temperature, Power consumption), and the power consumption in the new smart city are calculated, respectively. In the case where the candidate model having the largest correlation coefficient is the model MX(Temperature, Power consumption), the existing smart city X is determined as the basic environment EB. Subsequently, the model MX(Day of the week, Traffic volume), which is adapted for the existing smart city X and outputs the traffic volume when the day of the week is input, is determined as the basic model MB. The target model MN(Day of the week, Traffic volume) is created based on this basic model MX(Day of the week, Traffic volume).

In a first example of creation of the target model MT, the basic model MB is set to the target model MT, as it is.

In a second example of creation of the target model MT, the target model MT is created by fine-tuning the basic model MB. In the fine-tuning of the embodiment according to the present disclosure, the weight of layers of the basic model MB is relearned, using teacher data (teacher data of the target input and teacher data of the target output), without changing the number of layers of the basic model MB.

In a third example of creation of the target model MT, the target model MT is created by transfer-learning the basic model MB. In the transfer-learning of the embodiment according to the present disclosure, at least one layer is added to the basic model MB without changing the weights of the layers of the basic model MB, and the weight(s) of the added layer(s) is learned using teacher data (teacher data of the target input and teacher data of the target output).

In the embodiment according to the present disclosure, when the target model MT is created, the target model MT is then transmitted from the server 20 and received by the user device 10. The target model MT is stored in, for example, the storage device 13 of the user device 10.

In the embodiment according to the present disclosure, the target model MT is then used in the user device 10. That is, the data of the target input IT is input to the target model MT, and the data of the target output OT is output from the target model MT.

As described above, in the embodiment according to the present disclosure, a new model (target model MT) is created using the created model(s), so that the new model can be created more easily. Moreover, the basic environment EB is considered to have a high correlation with the target environment ET, and accordingly, the target model MT created based on the basic model MB adapted for the basic environment EB can provide more appropriate results for the target environment ET.

Figure 5:
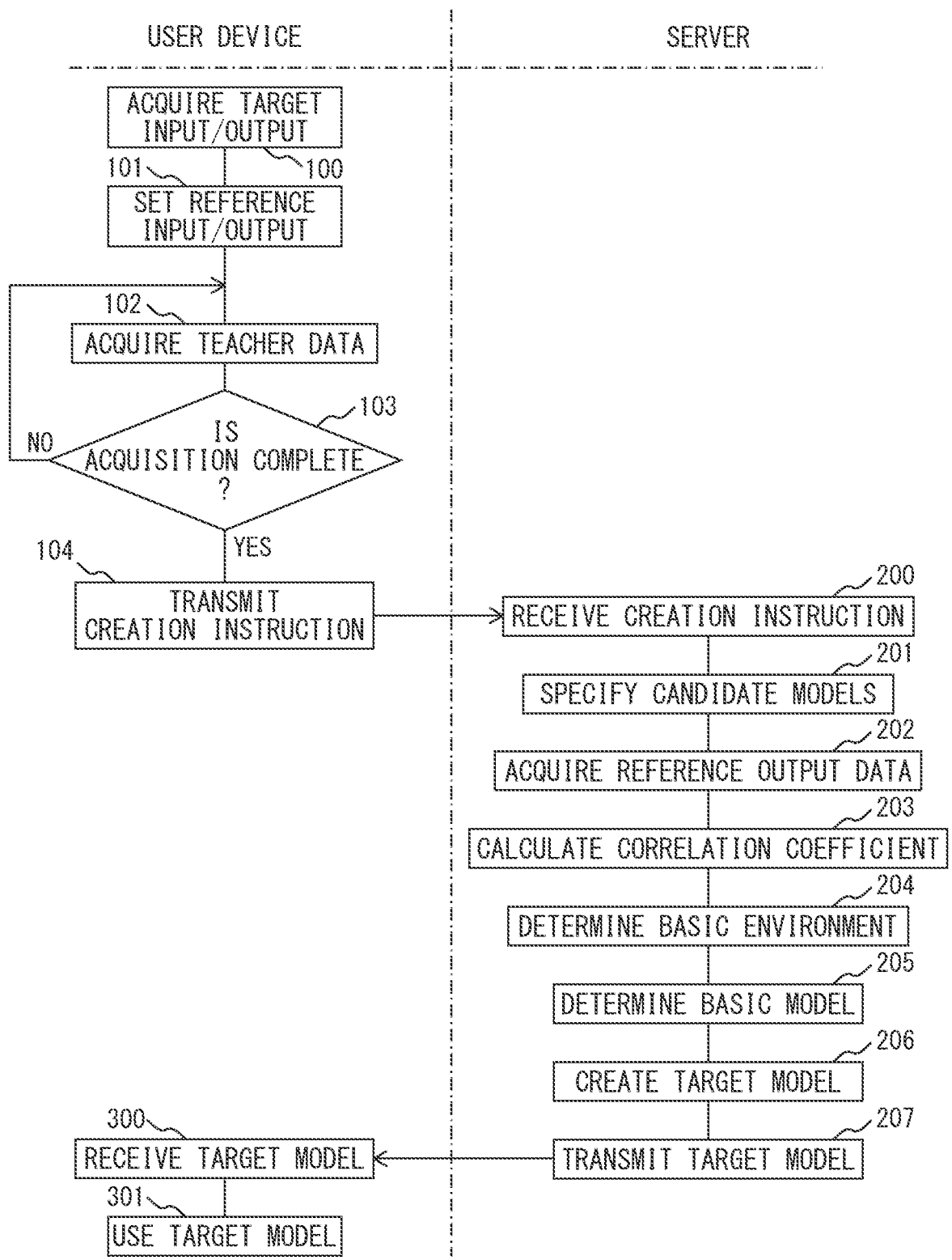
FIG. 5 is a flowchart showing a target model creation routine according to an embodiment of the present disclosure.

FIG. 5 shows a routine for creating the target model MT in the embodiment according to the present disclosure. Referring to FIG. 5, at step 100, the target input IT and the target output OT are acquired at the user device 10. In the subsequent step 101, the reference input IR and the reference output OR are set at the user device 10. In the subsequent step 102, the teacher data are acquired at the user device 10. In the subsequent step 103, whether the acquisition of the teacher data is completed is determined at the user device 10. When it is determined that the acquisition of the teacher data is not completed, the process returns to step 102. When it is determined that the acquisition of the teacher data is completed, the process proceeds to step 104, where, at the user device 10, the teacher data and the instruction to create the target model MT are transmitted to the server 20.

In the subsequent step 200, the teacher data and the creation instruction are received at the server 20. In the subsequent step 201, candidate models MC are determined at the server 20. In the subsequent step 202, the data of the reference output OR output from the candidate models MC are acquired at the server 20. In the subsequent step 203, the correlation coefficients CC are calculated at the server 20. In the subsequent step 204, the basic environment EB is determined at the server 20. In the subsequent step 205, the basic model MB is determined at the server 20. In the subsequent step 206, the target model MT is created at the server 20. In the subsequent step 207, the target model MT is transmitted at the server 20.

In the subsequent step 300, the target model MT is received at the user device 10. In the subsequent step 301, the target model MT is used at the user device 10.

Figure 6:
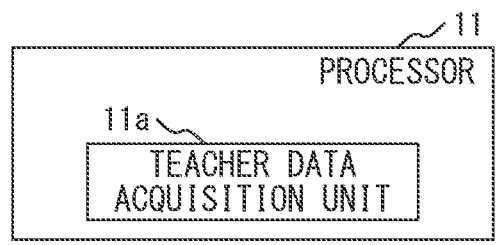
FIG. 6 is a functional block diagram of one or more processors of the user device according to an embodiment of the present disclosure.

FIG. 6 is a functional block diagram of the one or more processors 11 of the user device 10 of the embodiment according to the present disclosure, regarding the creation of the target model MT. Referring to FIG. 6, the one or more processors 11 include a teacher data acquisition unit 11a. The teacher data acquisition unit 11a is configured to acquire the teacher data of the reference input related to the target environment and the teacher data of the reference output corresponding to the teacher data of the reference input.

Figure 7:
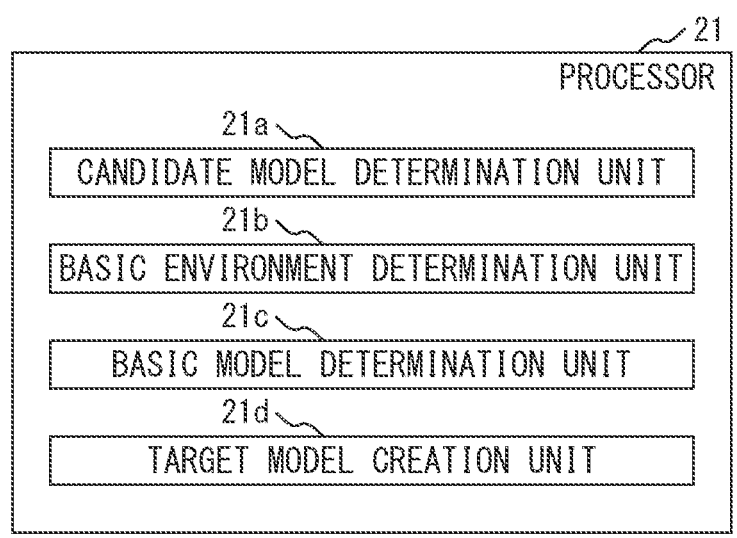
FIG. 7 is a functional block diagram of one or more processors of the server according to an embodiment of the present disclosure.

FIG. 7 is a functional block diagram of the one or more processors 21 of the server 20 of the embodiment according to the present disclosure, regarding the creation of the target model MT. Referring to FIG. 7, the one or more processors 21 include a candidate model determination unit 21a, a basic environment determination unit 21b, a basic model determination unit 21c, and a target model creation unit 21d. The candidate model determination unit 21a is configured to determine a plurality of candidate models which are adapted respectively for a plurality of candidate environments different from the target environment and output a reference output respectively when a reference input is input. In this respect, the reference input and the reference output satisfy either or both of the fact that the reference input is different from the target input and the fact that the reference output is different from the target output. The basic environment determination unit 21b is configured to determine the basic environment from among the plurality of candidate environments, based on the data of the reference output obtained by respectively inputting the teacher data of the reference input into the plurality of candidate models, and the teacher data of the reference output. The basic model determination unit 21c is configured to determine, as the basic model, a model which is adapted for the basic environment and output the target output when the target input is input. The target model creation unit 21d is configured to create a target model based on the basic model. Note that the server 20 of the embodiment according to the present disclosure functions as a model creation device.

REFERENCE SIGNS LIST 1 model creation system
10 user device
20 server (model creation device)
21 processor
21a candidate model determination unit
21b basic environment determination unit
21c basic model determination unit
21d target model creation unit

The invention claimed is:

1. A model creation device for creating a target model which is adapted for a target environment and which is configured to output a target output when a target input is input, the device comprising:
   a processor programmed to;
      determine a plurality of candidate models, the candidate models being adapted respectively for a plurality of candidate environments different from the target environment and being configured to output a reference output respectively when a reference input is input, the reference input and the reference output satisfying either or both of the fact that the reference input is different from the target input and the fact that the reference output is different from the target output;
      determine a basic environment from among the plurality of candidate environments, based on the data of the reference output obtained by respectively inputting teacher data of the reference input related to the target environment into the plurality of candidate models, and teacher data of the reference output corresponding to the teacher data of the reference input;
      determine, as a basic model, a model which is adapted for the basic environment and is configured to output the target output when the target input is input; and
      create the target model based on the basic model.

2. The model creation device according to claim 1, wherein the reference input is different from the target input and the reference output is different from the target output.

3. The model creation device according to claim 1, wherein the processor is programmed to determine a candidate model having the highest correlation between the data of the reference output obtained by respectively inputting the teacher data of the reference input into the plurality of candidate models and the teacher data of the reference output, and to determine, as the basic environment, a candidate environment for which the candidate model having the highest correlation is adapted.

4. The model creation device according to claim 1, wherein the processor is programmed to set the basic model to the target model, as it is.

5. The model creation device according to claim 1, wherein the processor is programmed to create the target model by fine-tuning the basic model.

6. The model creation device according to claim 1, wherein the processor is programmed to create the target model by transfer-learning the basic model.

7. The model creation device according to claim 1, wherein the target environment and the candidate environment are cities.

8. A computer-implemented method of creating a target model which is adapted for a target environment and which is configured to output a target output when a target input is input, the method comprising:
   determining a plurality of candidate models, the candidate models being adapted respectively for a plurality of candidate environments different from the target environment and being configured to output a reference output respectively when a reference input is input, the reference input and the reference output satisfying either or both of the fact that the reference input is different from the target input and the fact that the reference output is different from the target output;
   determining a basic environment from among the plurality of candidate environments, based on the data of the reference output obtained by respectively inputting teacher data of the reference input related to the target environment into the plurality of candidate models, and teacher data of the reference output corresponding to the teacher data of the reference input;
   determining, as a basic model, a model which is adapted for the basic environment and is configured to output the target output when the target input is input; and
   creating the target model based on the basic model.

9. A model creation system for creating a target model which is adapted for a target environment and which is configured to output a target output when a target input is input, the system comprising:
   a first processor and a second processor;
   wherein the first processor is programmed to determine a plurality of candidate models, the candidate models being adapted respectively for a plurality of candidate environments different from the target environment and being configured to output a reference output respectively when a reference input is input, the reference input and the reference output satisfying either or both of the fact that the reference input is different from the target input and the fact that the reference output is different from the target output, wherein the second processor is programmed to acquire teacher data of the reference input related to the target environment and teacher data of the reference output corresponding to the teacher data of the reference input, and
wherein the first processor is programmed to:
determine a basic environment from among the plurality of candidate environments, based on the data of the reference output obtained by respectively inputting the teacher data of the reference input into the plurality of candidate models, and the teacher data of the reference output;
determine, as a basic model, a model which is adapted for the basic environment and is configured to output the target output when the target input is input; and
create the target model based on the basic model.

* * * * *